United States Patent [19]

Bartmann et al.

[11] Patent Number: 5,300,557
[45] Date of Patent: Apr. 5, 1994

[54] MOLDING COMPOSITIONS WHICH ARE STABLE TO ALCOHOLS AND BOILING WATER

[75] Inventors: Martin Bartmann, Recklinghausen; Jürgen Finke, Marl; Hans-Joachim Panoch, Haltern; Markus Wenzel, Recklinghausen, all of Fed. Rep. of Germany

[73] Assignee: Huels Aktiengesellschaft, Marl, Fed. Rep. of Germany

[21] Appl. No.: 904,898

[22] Filed: Jun. 25, 1992

Related U.S. Application Data

[63] Continuation of Ser. No. 599,941, Oct. 19, 1990, abandoned.

[30] Foreign Application Priority Data

Oct. 20, 1989 [DE] Fed. Rep. of Germany ....... 3934926

[51] Int. Cl.$^5$ .............. C08J 3/20; C08K 3/00; C08L 77/00; C08G 69/26
[52] U.S. Cl. .................... 524/606; 524/607; 528/340
[58] Field of Search ............. 524/606, 607; 528/340

[56] References Cited

U.S. PATENT DOCUMENTS

| | | | |
|---|---|---|---|
| 4,255,560 | 3/1981 | Meyer et al. | 528/340 |
| 4,433,137 | 2/1984 | Pfeifer | 528/348 |
| 4,476,280 | 10/1984 | Poppe et al. | 528/340 |
| 4,731,421 | 3/1988 | Hoppe et al. | 525/432 |
| 4,847,356 | 7/1989 | Hoppe et al. | 528/346 |
| 4,863,991 | 9/1989 | Poppe et al. | 524/606 |

FOREIGN PATENT DOCUMENTS

| | | | |
|---|---|---|---|
| 2161829 | 7/1987 | Japan | 528/340 |
| 63-101419A | 5/1988 | Japan . | |

OTHER PUBLICATIONS

Database WPIL, No. 88-164104 (24), Derwent Publications Ltd., London (GB), May 6, 1988 (Abstract of JP-A-63-101419).
Patent Abstracts of Japan, vol. 12, No. 242 (C-510)(3089) Jul. 8, 1988 (Abstract of JP-A-63-30528).

*Primary Examiner*—Paul R. Michl
*Assistant Examiner*—P. Niland
*Attorney, Agent, or Firm*—Millen, White, Zelano & Branigan

[57] ABSTRACT

The invention relates to molding compositions which are stable with respect to alcohol and boiling water. The known molding compositions which are stable to boiling water and comprise amorphous copolyamides have unsatisfactory stability to alcohols. There is therefore a demand to improve molding compositions comprising polyamide in this respect.

The invention provides molding compositions based on an amorphous copolyamide prepared from:
(A) terephthalic acid and/or isophthalic acid; and
(B) 10-70 mol % of decamethylenediamine, 10-80 mol % of trimethylhexamethylenediamine, and 10-50 mol % of bis(4-aminocyclohexyl)methane.

20 Claims, No Drawings

MOLDING COMPOSITIONS WHICH ARE STABLE TO ALCOHOLS AND BOILING WATER

This application is a continuation of application Ser. No. 07/599,941, filed Oct. 19, 1990, now abandoned.

BACKGROUND OF THE INVENTION

The invention relates to molding compositions which are stable to alcohols and boiling water and are based on amorphous copolyamides.

Molding compositions which are stable to boiling water and are based on amorphous polyamides are known (see, e.g., European Patents 50,742 and 69,700 and German Patent 3,600,015). However, there is a crucial problem in the suitability for use of these molding compositions—they are not stable to alcohols, such as for example, methanol, ethanol, propanols, butanols or the like. As the case may be, they tend towards turbidity, swelling or adhesion in the presence of alcohols; in some cases, they are completely soluble in alcohol. However, for many applications, such as, for example, for spectacle frames or inspection windows in apparatuses, stability to alcohols is an absolute necessity.

SUMMARY OF THE INVENTION

An object of the invention is to provide molding compositions which alleviate or do not have the above-mentioned disadvantages, but without losing their other advantageous properties.

Upon further study of the specification and appended claims, further objects and advantages of this invention will become apparent to those skilled in the art.

These objects are achieved with the aid of copolyamides obtained by polycondensation of A. terephthalic acid and/or isophthalic acid
with
B. 10–70 mol % of decamethylenediamine
   10–80 mol % of trimethylhexamethylenediamine
   10–50 mol % of bis(4-aminocyclohexyl)methane.

Preferred molding compositions are those based on copolyamides obtained by polycondensation of A. terephthalic acid and/or isophthalic acid
with
B. 10–40 mol % of decamethylenediamine
   10–80 mol % of trimethylhexamethylenediamine
   10–50 mol % of bis(4-aminocyclohexyl)methane.

In a further preferred embodiment, copolyamides are used which have been obtained by polycondensation of A. terephthalic acid and/or isophthalic acid
with
B. 10–70 mol % of iso-decamethylenediamine
   10–80 mol % of trimethylhexamethylenediamine
   10–50 mol % of bis(4-aminocyclohexyl)methane.

Furthermore, preferred molding compositions are those based on copolyamides obtained by polycondensation of A. 0–70 mol % of terephthalic acid
   100–30 mol % of isophthalic acid
with
B. 10–70 mol % of decamethylenediamine
   10–80 mol % of trimethylhexamethylenediamine
   10–50 mol % of bis(4-aminocyclohexyl)methane.

In a further preferred embodiment, copolyamides are used which have been obtained by polycondensation of A. 0–50 mol % of terephthalic acid
   100–50 mol % of isophthalic acid
with
B. 20–60 mol % of decamethylenediamine
   20–60 mol % of trimethylhexamethylenediamine
   10–40 mol % of bis(4-aminocyclohexyl)methane.

Iso-decamethylenediamine here denotes aliphatic diamines having the empirical formula $C_{10}H_{24}N_2$ whose $NH_2$ groups are separated by at least 7 to 9 $CH_2$ units. The term decamethylenediamine additionally also covers n-decamethylenediamine. The diamines can be employed as pure substances or as mixtures.

Trimethylhexamethylenediamine is taken to mean the isomer mixture usually produced in industry. It usually comprises approximately equal proportions by weight of 2,4,4-trimethylhexamethylenediamine and 2,2,4-trimethylhexamethylenediamine.

The ratio of monomer mixture A to monomer mixture B is preferably about 1:1.

The copolyamides on which the molding compositions according to the invention are based have a relative solution viscosity ($\eta_{rel}$) in the range of about 1.4–2.1, preferably in the range of about 1.55–1.95. The glass point ($T_g$) of the copolyamides is in the range of about 120°–180° C., preferably in the range of about 140°–170° C.

The method of preparing such copolyamides is known in principle. The polycondensation of the components is carried out in the melt. If necessary, the polycondensation can be carried out in the presence of a phosphorusderived acid of the general formula $H_3PO_n$ where n=2 to 4, or in the presence of triphenyl phosphite.

Suitable phosphorus-derived acids are hypophosphorous acid, phosphorous acid and phosphoric acid.

If a catalyst is added, it is employed in amounts of about 0.001–1 mol %, preferably about 0.001–0.1 mol %, relative to the sum of all the monomers.

The reaction is carried out in the melt at temperatures in the range of about 200°–350° C., preferably about 210°–320° C.

The reaction is usually carried out at atmospheric pressure under inert gas. However, it is also possible to use superatmospheric pressure or subatmospheric pressure.

The copolyamides are converted into molding compositions in customary machines by injection molding or extrusion.

The molding compositions may additionally contain fillers, such as talc, or reinforcing agents, such as glass fibers, ARAMID ® fibers or carbon fibers, and other customary additives, such as, for example, pigments or stabilizers.

The molding compositions thus can contain about 0–40 wt %, preferably 0–35 wt % fillers, based on overall weight of the molding composition. Similarly, the molding composition can contain about 0–2 wt %, preferably 0–1 wt % of pigments and about 0–1.2 wt %, preferably 0–0.9 wt % stabilizers.

The molding compositions are converted into moldings, fibers, films, etc., by customary processes, such as injection molding, extrusion or the like.

The molding compositions according to the invention have surprisingly high stability to alcohols, without their good general properties, in particular the stability to boiling water, being adversely affected.

Without further elaboration, it is believed that one skilled in the art can, using the preceding description, utilize the present invention to its fullest extent. The following preferred specific embodiments are, therefore, to be construed as merely illustrative, and not limitative of the remainder of the disclosure in any way whatsoever.

In the foregoing and in the following examples, all temperatures are set forth uncorrected in degrees Celsius and unless otherwise indicated, all parts and percentages are by weight.

The entire disclosures of all applications, patents and publications cited above and of corresponding application(s) Federal Republic of Germany P 39 34 926.8, filed Oct. 20, 1989, are hereby incorporated by reference.

EXAMPLES

The parameters given in the description and in the examples were determined using the methods below.

The relative solution viscosity ($\eta_{rel}$) was determined on 0.5% strength by weight polyamide solutions in m-cresol at 25° C.

The glass point ($T_g$) results from DSC measurements at a heating rate of 20° K/min.

EXAMPLE 1

| Starting materials: | |
|---|---|
| 4.984 kg of terephthalic acid | (30 mol) |
| 2.068 kg of i-decamethylenediamine*) | (12 mol) |
| 1.899 kg of trimethylhexamethylenediamine | (12 mol) |
| 1.262 kg of bis(4-aminocyclohexyl)methane | (6 mol) |
| 10.000 kg of water | |
| 0.09 g by weight of H₃PO₂ (as a 50% strength by weight aqueous solution) | |

*)85% of 2-methylnonamethylenediamine
14% of 2-ethyloctamethylenediamine
1% of 2,7-dimethyloctamethylene-1,8-diamine The starting materials were dissolved in water under nitrogen in a polycondensation reactor at 170° C. and at a pressure of 9 bar. The temperature of the reaction mixture was increased to 230° C. while maintaining the pressure, and the mixture was then stirred at this temperature for 1 hour. The temperature was subsequently increased to 300° C. The water liberated in the polycondensation was removed by distillation. After 4 hours at 300° C., the copolyamide was discharged from the reactor.

$$\eta_{rel} = 1.78 \quad T_g = 150° \text{ C.}$$

EXAMPLE 2

| Starting materials: | |
|---|---|
| 25.000 kg of isophthalic acid | (150.5 mol) |
| 7.781 kg of n-decamethylene-1,10-diamine | (45.15 mol) |
| 9.516 kg of trimethylhexamethylenediamine | (60.19 mol) |
| 9.499 kg of bis(4-aminocyclohexyl)methane | (45.15 mol) |
| 29.400 kg of water | |
| 0.518 g of H₃PO₂ (as a 50% strength by weight aqueous solution) | | the polycondensation was carried out analogously to Example 1.

$$\eta_{rel} = 1.74 \quad T_g = 163° \text{ C.}$$

EXAMPLE 3

| Starting materials: | |
|---|---|
| 4.200 kg of isophthalic acid | (25.28 mol) |
| 1.800 kg of terephthalic acid | (10.84 mol) |
| 2.116 kg of n-decamethylene-1,10-diamine | (14.45 mol) |
| 2.284 kg of trimethylhexamethylenediamine | (9.39 mol) |
| 1.976 kg of bis(4-aminocyclohexyl)methane | (12.28 mol) |
| 7.000 kg of water | |
| 0.25 g of H₃PO₂ (as a 50% strength by weight aqueous solution) | |

The polycondensation was carried out analogously to Example 1.

$$\eta_{rel} = 1.68 \quad T_g = 153° \text{ C.}$$

EXAMPLE 4

| Starting materials: | |
|---|---|
| 4.984 kg of terephthalic acid | (30 mol) |
| 2.068 kg of i-decamethylenediamine*) | (12 mol) |
| 1.622 kg of trimethylhexamethylenediamine | (10.5 mol) |
| 1.578 kg of bis(4-aminocyclohexyl)methane | (7.5 mol) |
| 10.000 kg of water | |
| 0.18 g of H₃PO₂ (as a 50% strength by weight aqueous solution) | |

*)For the composition of the isomer mixture - see Example 1

The polycondensation was carried out analogously to Example 1.

$$\eta_{rel} = 1.72 \quad T_g = 161° \text{ C.}$$

EXAMPLE 5

| Starting materials: | |
|---|---|
| 3.000 kg of terephthalic acid | (18.06 mol) |
| 3.000 kg of isophthalic acid | (18.06 mol) |
| 2.116 kg of n-decamethylene-1,10 diamine) | (12.28 mol) |
| 2.512 kg of trimethylhexamethylenediamine | (15.89 mol) |
| 1.672 kg of bis(4-aminocyclohexyl)methane | (7.95 mol) |
| 7.000 kg of water | |
| 0.250 g of H₃PO₂ (as a 50% strength by weight aqueous solution) | |

The polycondensation was carried out analogously to Example 1.

$\eta_{rel} = 1.70 \quad T_g = 155° \text{ C.}$

EXAMPLE 6

| Starting materials: | |
|---|---|
| 4.200 kg of isophthalic acid | (25.28 mol) |
| 1.800 kg of terephthalic acid | (10.84 mol) |
| 2.116 kg of n-decamethylene-1,10-diamine | (14.45 mol) |
| 2.284 kg of trimethylhexamethylenediamine | (9.39 mol) |
| 1.976 kg of bis(4-aminocyclohexyl)methane | (12.28 mol) |
| 7.000 kg of water | |

The polycondensation was carried out analogously to Example 1.

$\eta_{rel} = 1.64 \quad T_g = 153° \text{ C.}$

EXAMPLE 7

The copolyamides prepared in accordance with Examples 1 to 6 were compared with two commercially available copolyamides (A) and (B) labelled as being stable to boiling water.

Copolyamide (A) (TROGAMID® T) contains, as monomers, terephthalic acid and trimethylhexamethylenediamine.

Copolyamide (B) (GRILLAMID® TR 55) is built up from about 30 mol % of isophthalic acid, about 30 mol % of 3,3'-dimethyl-4,4-diaminodicyclohexylmethane and about 40 mol % of lauryl lactam as monomers.

The copolyamides according to the invention and the comparison products were stored in ethanol for 3 weeks at room temperature. While the copolyamides according to the invention exhibited no change in appearance and solution viscosity, the comparison products became tacky after only a few hours. The boiling water test (24 hours in boiling water) likewise resulted in no change for the copolyamides according to the invention; considerable turbidity was observed for copolyamide (A) and slight turbidity for copolyamide (B).

The preceding examples can be repeated with similar success by substituting the generically or specifically described reactants and/or operating conditions of this invention for those used in the preceding examples.

From the foregoing description, one skilled in the art can easily ascertain the essential characteristics of this invention, and without departing from the spirit and scope thereof, can make various changes and modifications of the invention to adapt it to various usages and conditions.

What is claimed is:

1. A molding composition which is stable with respect to alcohols and boiling water, comprising an amorphous copolyamide obtained by polycondensation of:
   (A) terephthalic acid, isophthalic acid or mixtures thereof; and
   (B) about 10-70 mol % of decamethylenediamine, about 10-80 mol % of trimethylhexamethylenediamine, and about 10-50 mol % of bis(4-aminocyclohexyl)-methane;
and an additive acceptable for use in molding compositions.

2. A molding composition according to claim 1, wherein said copolyamide is obtained by polycondensation of:
   (A) terephthalic acid, isophthalic acid or mixtures thereof; and
   (B) about 10-40 mol % of decamethylenediamine, about 10-80 mol % of trimethylhexamethylenediamine, and about 10-50 mol % of bis(4-aminocyclohexyl)-methane.

3. A molding composition according to claim 1, wherein said copolyamide is obtained by polycondensation of:
   (A) terephthalic acid, isophthalic acid or mixtures thereof; and
   (B) about 10-70 mol % of iso-decamethylenediamine, about 10-80 mol % of trimethylhexamethylenediamine, and about 10-50 mol % of bis(4-aminocyclohexyl)-methane.

4. A molding composition according to claim 1, wherein said copolyamide is obtained by polycondensation of:
   (A) about 0-70 mol % of terephthalic acid, and about 100-30 mol % of isophthalic acid; and
   (B) about 10-70 mol % of decamethylenediamine, about 10-80 mol % of trimethylhexamethylenediamine, and about 10-50 mol % of bis(4-aminocyclohexyl)-methane.

5. A molding compositions according to claim 1, wherein the copolyamide is obtained by polycondensation of:
   (A) about 0-50 mol % of terephthalic acid, and about 100-50 mol % of isophthalic acid; and
   (B) about 20-60 mol % of decamethylenediamine, about 20-60 mol % of trimethylhexamethylenediamine, and about 10-40 mol % of bis(4-aminocyclohexyl)-methane.

6. A molding composition according to claim 1, wherein said copolyamide has a relative solution viscosity of about 1.4-2.1.

7. A molding composition according to claim 1, wherein said copolyamide has a relative solution viscosity of about 1.55-1.95.

8. A molding composition according to claim 1, wherein said copolyamide has a glass point, $T_g$, of about 120°-180° C.

9. A molding composition according to claim 1, wherein said copolyamide has a glass point, $T_g$, of about 140°-170° C.

10. A molding composition according to claim 1, wherein said polycondensation to obtain said copolyamide is conducted in the presence of a phosphorous derived acid of the formula $H_3PO_n$, wherein n is 2-4.

11. A molding composition according to claim 1, wherein said polycondensation to obtain said copolyamide is conducted in the presence of hypophosphorous acid, phosphorous acid, phosphoric acid, triphenyl phosphite or mixtures thereof.

12. A molding composition according to claim 11, wherein the phosphorous-derived acid catalyst is present in an amount of about 0.001-1 mol % based on the sum total moles of all of the monomers.

13. A molding composition according to claim 11, wherein the phosphorous-derived acid catalyst is present in an amount of about 0.001-0.1 mol % based on the sum total moles of all of the monomers.

14. A molding composition according to claim 1, further comprising fillers, reinforcing agents, pigments and/or stabilizers.

15. A molding composition according to claim 14, comprising about 0–40 wt % fillers, about 0–2 wt % pigments and about 0–1.2 wt % stabilizers, based on overall weight of the molding composition.

16. An amorphous copolyamide comprising monomer units of (1) terephthalic acid, isophthalic acid or mixtures thereof, (2) decamethylenediamine, (3) trimethylhexamethylenediamine, and (4) bis(4-aminocyclohexyl)-methane, wherein said copolyamide is obtained by polycondensation of:
   (A) terephthalic acid, isophthalic acid or mixtures thereof; and
   (B) about 10–70 mol % of decamethylenediamine, about 10–80 mol % of trimethylhexamethylenediamine, and about 10–50 mol % of bis(4-aminocyclohexyl)-methane.

17. An amorphous copolyamide according to claim 16, wherein said copolyamide is obtained by polycondensation of:
   (A) terephthalic acid, isophthalic acid or mixtures thereof; and
   (B) about 10–40 mol % of decamethylenediamine, about 10–80 mol % of trimethylhexamethylenediamine, and about 10–50 mol % of bis(4-aminocyclohexyl)-methane.

18. An amorphous copolyamide according to claim 16, wherein said copolyamide is obtained by polycondensation of:
   (A) terephthalic acid, isophthalic acid or mixtures thereof; and
   (B) about 10–70 mol % of iso-decamethylenediamine, about 10–80 mol % of trimethylhexamethylenediamine, and about 10–50 mol % of bis(4-aminocyclohexyl)-methane.

19. An amorphous copolyamide according to claim 16, wherein said copolyamide is obtained by polycondensation of:
   (A) about 0–70 mol % of terephthalic acid, and about 100–30 mol % of isophthalic acid; and
   (B) about 10–70 mol % of decamethylenediamine, about 10–80 mol % of trimethylhexamethylenediamine, and about 10–50 mol % of bis(4-aminocyclohexyl)-methane.

20. An amorphous copolyamide according to claim 16, wherein said copolyamide is obtained by polycondensation of:
   (A) about 0–50 mol % of terephthalic acid, and about 100–50 mol % of isophthalic acid; and
   (B) about 20–60 mol % of decamethylenediamine, about 20–60 mol % of trimethylhexamethylenediamine, and about 10–40 mol % of bis(4-aminocyclohexyl)-methane.

* * * * *